July 3, 1934.  A. W. WHEATON  1,964,836
FAUCET
Filed Sept. 15, 1933
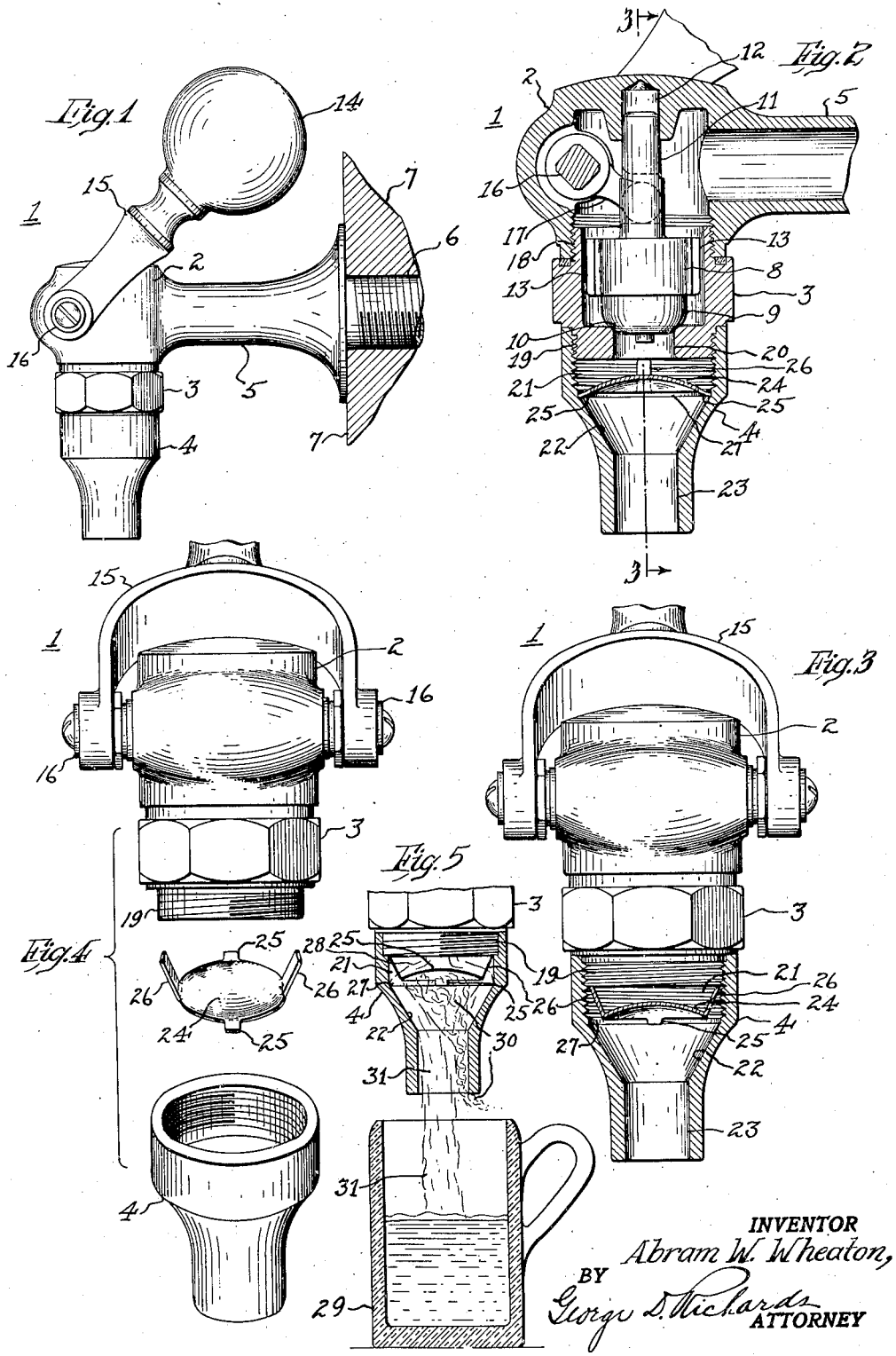
INVENTOR
Abram W. Wheaton,
BY George D. Richards
ATTORNEY Patented July 3, 1934

1,964,836

UNITED STATES PATENT OFFICE 1,964,836

FAUCET

Abram W. Wheaton, Maplewood, N. J., assignor to A. W. Wheaton Brass Works, Newark, N. J., a corporation of New Jersey Application September 15, 1933, Serial No. 689,581

2 Claims. (Cl. 225—6)

This invention relates, generally, to faucets and the invention has reference, more particularly, to an improved faucet, which while adapted for general purposes, is especially intended for use as a beer faucet.

The principal object of the present invention is to provide an improved faucet having a novel construction of gas separating baffle incorporated therein, said baffle serving to liberate a considerable portion of the carbon dioxide and other gas content of the beer as the same flows through the faucet, thereby greatly reducing the amount of foam ordinarily produced when drawing beer and preventing considerable waste which usually occurs when using ordinary beer faucets.

Another object of the present invention lies in the provision of an improved faucet having a novel sheet metal gas separating baffle of simple, rugged construction, the said baffle being so constructed as to enable the same to be readily inserted into or removed from the faucet and having means to insure its proper installation in the faucet.

Other objects of this invention, not at this time more particularly enumerated, will be clearly understood from the following detailed description of the same.

The invention is clearly illustrated in the accompanying drawing, in which:

Fig. 1 is a view in side view of the improved faucet of this invention.

Fig. 2 is an enlarged vertical sectional view of a portion of the structure shown in Fig. 1.

Fig. 3 is a view in front elevation of the faucet with parts broken away to show the novel baffle construction.

Fig. 4 is a view illustrating the manner of assembling the gas separating baffle in the faucet, and Fig. 5 is a schematic view showing the operation of the gas separating baffle.

Similar characters of reference are employed in said views, to indicate corresponding parts.

Referring now to the said drawing, the reference numeral 1 designates the faucet as a whole, the said faucet having a casing consisting of an upper casing portion 2, a central or yoke portion 3 and a lower or nozzle portion 4. The upper casing portion 2 has a flared tubular inlet extension 5 formed thereon, the said extension being provided with a reduced threaded end portion 6 adapted to extend through a wall or panel 7 for connection to the piping (not shown) supplying the beer or other liquid to the faucet.

A valve 8 is contained within the hollow interior of casing portions 2 and 3 and has a valve disc 9 of rubber or other material for engaging a valve seat 10 formed at the bottom of casing portion 3. Valve 8 has a valve stem 11 that extends upwardly into a centering recess 12 provided in casing portion 2. Fins 13 are provided on valve 8 for suitably spacing the valve from the walls of casing portion 3 during the operation of the valve.

The faucet 1 is provided with an operating knob 14 that is attached to a bifurcated lever 15, which lever is fixed upon the ends of a transverse shaft 16. Shaft 16 extends into casing portion 2 and carries an arm 17 that projects into a recess in valve stem 11 for actuating the valve 8. Pulling forwardly upon knob 14 serves to effect the raising or opening of valve 8, while pushing this knob rearwardly into the position shown in Figs. 1 and 2 serves to close the same.

The central casing portion 3 is provided with reduced cylindrical upper and lower end portions 18 and 19 respectively that are threaded into the upper casing portion 2 and into the lower or nozzle portion 4, respectively. The lower end portion 19 has a vertical discharge opening 20 therein through which the beer or other liquid flows after passing the valve disc 9. From the discharge opening 20, the dispensed liquid flows into a chamber 21 provided within nozzle portion 4. The nozzle portion 4 has a converging lower portion so that the lower portion of chamber 21 has converging side walls 22, the said chamber terminating in a discharge opening 23.

Positioned within chamber 21 is a gas separating baffle 24 that is preferably pressed from sheet metal, the said baffle being of substantially dome shape and having a convex upper surface and a concave lower surface. The circular peripheral edge portion of the baffle 24 is spaced radially inwardly somewhat from the side wall of chamber 21 by means of two pairs of diametrically disposed lugs 25 and 26.

Lugs 25 project in substantially opposite directions from the main body of the baffle 24 for engaging the side wall of chamber 21 preferably at the line of juncture of the converging portion 22 of the side wall with the vertical portion thereof. The lugs 26 project upwardly and outwardly from opposite points of the main body of the baffle 24, the said lugs 26 being positioned on a diametric line extending substantially at right angles to the diametric line passing through lugs 25.

The outer ends of lugs 26 engage the under surface of end portion 19 and also engage the side wall of chamber 21. Thus, these lugs 26 serve to space or position the main body of baffle 24 a desired distance below the end portion 19 of casing portion 3 and also cooperate with lugs 25 in spacing the peripheral edge portion of the baffle main body radially inwardly from the side wall of chamber 21, thereby providing an annular passage 27 through which the beer or other liquid flows on leaving the upper portion of chamber 21 to enter the lower conveying portion of this chamber.

In use, when the operating knob 14 is pulled forwardly, thereby causing valve disc 9 to be raised from its seat 10, the beer or other gas containing liquid 28 (see Fig. 5) flows downwardly through opening 20 and into the upper portion of chamber 21. Upon thus escaping into the upper portion of chamber 21 the pressure upon the beer is greatly reduced, thereby causing a considerable portion of the dissolved gases (mainly carbon dioxide) to pass out of solution, or in other words the gas is suddenly liberated forming a mass of small bubbles or foam. As this foam passes over the convex upper surface of the baffle 24 the speed of movement of the mass is decreased and, owing to the surface tension of the liquid, many of the small bubbles are consolidated into larger bubbles surrounded by substantially gas free liquid. The mass then passes through the narrow annular passage 27 at a somewhat faster speed at which time more gas is liberated to join the relatively large bubbles already produced. The region immediately below the baffle is a region of reduced pressure, and into this region the large gas bubbles move and consolidate while the heavy gas free liquid 31 flows on down and into the mug 29. The gases 30 collecting under the baffle 24 move downwardly relatively slowly as compared with the liquid 31 and escape at the mouth of the discharge opening 23.

Thus, the liquid 31 entering the mug 29 has had a considerable portion of its previously contained gases removed so that but little foam forms on top of this liquid and hence there is no necessity for scraping off the foam or head as waste as is commonly necessary when using ordinary faucets. Also, when using ordinary faucets, the bartender usually opens the faucet and fills the mug to overflowing. He then scrapes off the top foam and waits for the foam in the mug to subside, whereupon he again fills the mug, thereby consuming much time which is saved when using the faucet of this invention.

As many changes could be made in the above construction and many apparently widely different embodiments of this invention could be made without departing from the scope thereof, as defined by the following claims, it is intended that all matter contained in the above description or shown in the accompanying rdawings shall be interpreted as illustrative and not in a limiting sense.

I claim:—

1. A faucet comprising a casing consisting of upper, central and lower separable portions, the upper portion having an inlet opening therein, a valve seat in the central portion, a valve contained within said upper and central portions for cooperating with said valve seat, means for operating said valve, whereby communication between the central and lower casing portions is controlled, said lower casing portion having a sheet metal gas separating baffle therein, said baffle having a convex upper surface and a concave lower surface, and lugs provided on said baffle for engaging the side wall of said lower casing portion to thereby position said baffle centrally within said lower casing portion, certain of said lugs also serving to space said baffle downwardly from said central casing portion, whereby liquid entering the lower casing portion will flow over the convex upper surface and down around the peripheral edge of said baffle, said baffle creating a region of reduced pressure therebelow for collecting gases therein.

2. In a faucet of the character described, a gas separating baffle comprising a main body having a convex upper surface and a concave lower surface, and spacing lugs provided at the periphery of said main body, certain of said lugs extending directly outwardly from said main body for spacing the latter from the side wall of the valve casing and others of said lugs extending upwardly and outwardly from said main body for aiding said certain lugs in spacing the main body from the side wall of the casing and for spacing said main body from the valve discharge portion of the faucet.

ABRAM W. WHEATON.